United States Patent [19]

Gundy

[11] 4,430,912
[45] Feb. 14, 1984

[54] CUTTING APPARATUS AND METHOD

[75] Inventor: William P. Gundy, Amherst, N.H.

[73] Assignee: NPC Systems Inc., Milford, N.H.

[21] Appl. No.: 283,110

[22] Filed: Jul. 13, 1981

[51] Int. Cl.³ .............................................. B23B 5/14
[52] U.S. Cl. ............................................. 82/58; 82/54
[58] Field of Search .................. 82/54, 56, 57, 58, 100

[56] References Cited

U.S. PATENT DOCUMENTS

| | | | |
|---|---|---|---|
| 1,345,458 | 7/1920 | Pierce | 82/58 |
| 1,372,040 | 3/1921 | Rendano | 82/58 |
| 3,894,455 | 7/1975 | Stroobants | 82/58 |

*Primary Examiner*—W. D. Bray

*Attorney, Agent, or Firm*—Pearson & Pearson

[57] ABSTRACT

An accurate apparatus for cutting, and exactly centering, an annular crown of V cross section, on the end edge of the hollow cylindrical drill tube of a diamond core drill bit is achieved by a bit veeing cutter head having a pair of horizontal spaced apart flat planar plates forming a housing for a pair of arms of rectangular cross section, each pivoted to the other at one end and each having a roller cutter at the other end. The flat planar outer faces of the arms slidably contact the flat planar inner faces of the plates, to prevent cutter fluctuation, loose pivoting or off center V shaping of the annular crown.

6 Claims, 6 Drawing Figures

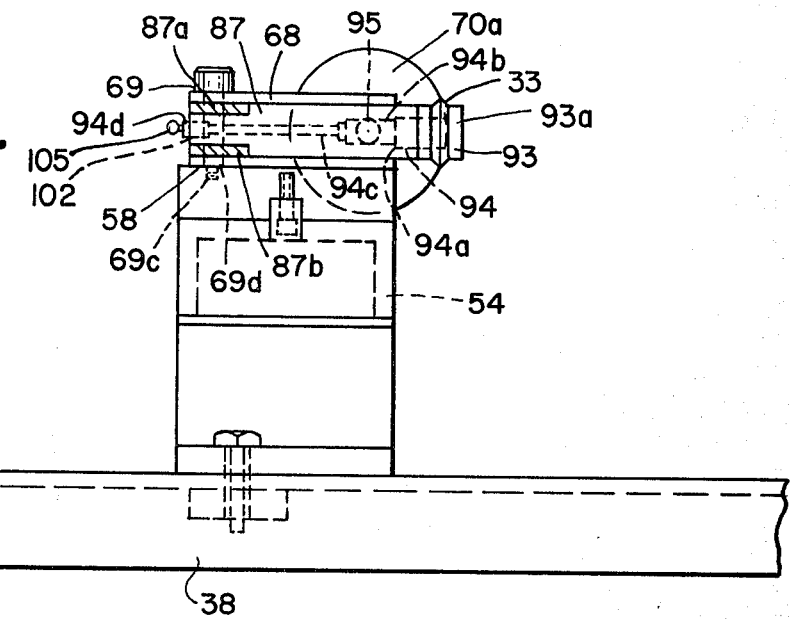
*Fig.3.*
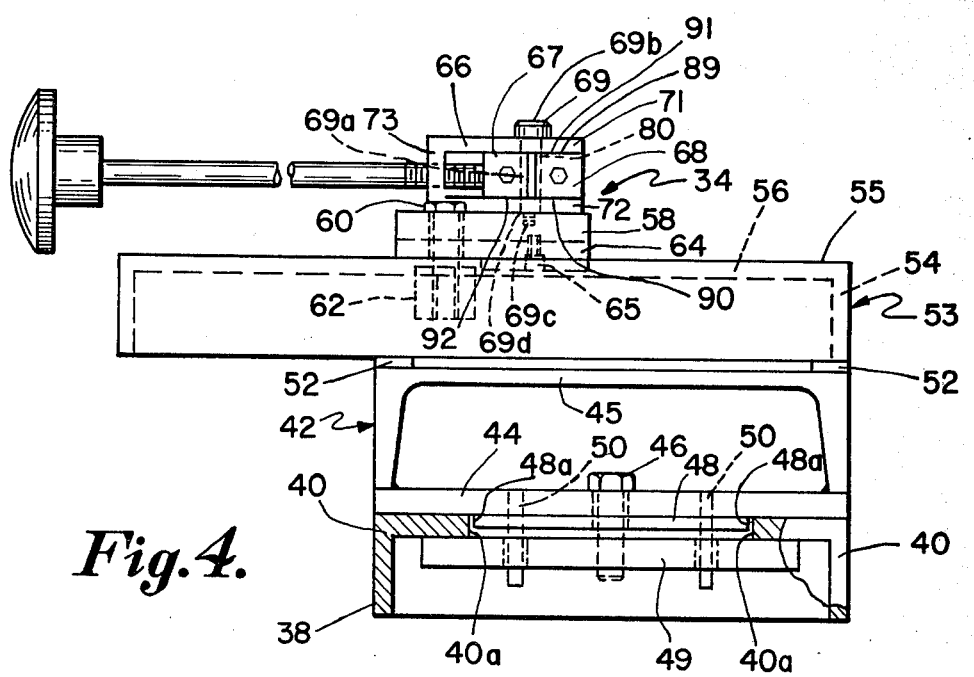
*Fig.4.*
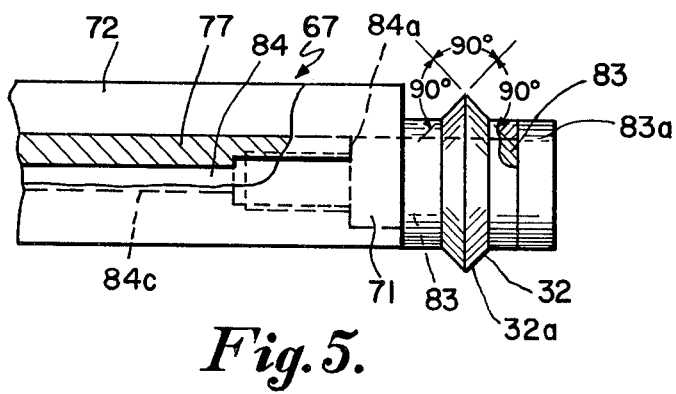
*Fig.5.*  *Fig.6.*

4,430,912

CUTTING APPARATUS AND METHOD

BACKGROUND OF THE INVENTION

The present invention relates to cutting machines and methods of cutting, and more particularly to a machine and method for cutting an annular crown edge on a cylindrical drill tube of a diamond core drill for attachment of the diamond core drill bit.

In the cutting of cores from material such as cement, it is customary to mount the cutting material which is in the form of an annular bit, on an annular bit crown. The edges of the bit and the crown are secured to each other as by brazing, as is known and described, for example, in U.S. Pat. No. 3,127,715 to Christensen, Apr. 7, 1964 for Diamond Cutting Devices and in U.S. Pat. No. 1,676,887 to Chamberlin July 10, 1928 for Core Drill Bit. Various cutters are known for cutting various cylindrical or annular materials. Thus, U.S. Pat. No. 912,238 to Finch Feb. 9, 1909, for Flange Cutting Machine, describes a machine for trimming the flanges on cylindrical bodies; U.S. Pat. No. 1,185,557 to Travis et al, May 30, 1916 for Flange Trimmer describes a machine for trimming flanges; and U.S. Pat. No. 734,427 to McCarter July 21, 1903, for Pipe Cutting Machine describes a machine for cutting pipe.

SUMMARY OF THE INVENTION

According to the invention, a machine for cutting a hollow cylindrical workpiece, or tube, from which the shank of a drill bit is to be formed comprises a chuck for holding the workpiece, means to rotate the chuck and the workpiece held in it, a carriage, means for adjusting the position of the carriage axially and transversely of the chuck rotational axis, and a cutting head carried by the carriage and comprising: a housing, or mounting having parallel plates which are joined by a junction plate, having a threaded opening, a set screw threaded into the opening, a first cutter arm, within the parallel plates of the housing, the first arm, and the housing plates having aligned openings. An axle, or pin, held by the carriage passes through the aligned openings so that the first cutter arm may rotate about the axis of the axle. A second cutting wheel arm is affixed rigidly to the housing between the plates and side by side with the first arm. The first arm receives the end of the set screw so that as the set screw advances against the first arm the end of the set screw tends to pivot the first arm in one direction toward the second arm, and the reaction of the set screw in the threaded junction tends to pivot the housing and the second arm in the opposite direction. A pair of cutter wheels are held in the cutter arms respectively and are thus drawn toward each other in a free floating manner.

Thus, the drill tube may be engaged in the chuck, the carriage positioned to place the cutter wheels on opposite sides of the tube rim, and the chuck rotated. As the set screw is advanced, a torque urges one cutter wheel against the tube rim and another equal torque advances the other cutter wheel against the tube rim to cut a V crown with equal force from both the external convex side and the internal concave side of the drill tube.

BRIEF DESCRIPTION OF THE DRAWINGS

The various objects, advantages, and novel features of the invention will be more fully apparent from the following detailed description when read in connection with the accompanying drawings in which like reference numerals refer to like parts, and in which:

FIG. 3 is a side view of the portion of the machine shown in FIG. 2;

FIG. 4 is an end view thereof;

FIG. 5 is a further enlarged detail plan view of a cutter wheel, of FIG. 2; and

FIG. 6 is a detail view in axial cross section of a crown cut achieved by the machine of FIG. 1.

DESCRIPTION OF THE PREFERRED EMBODIMENT

Figure 1:
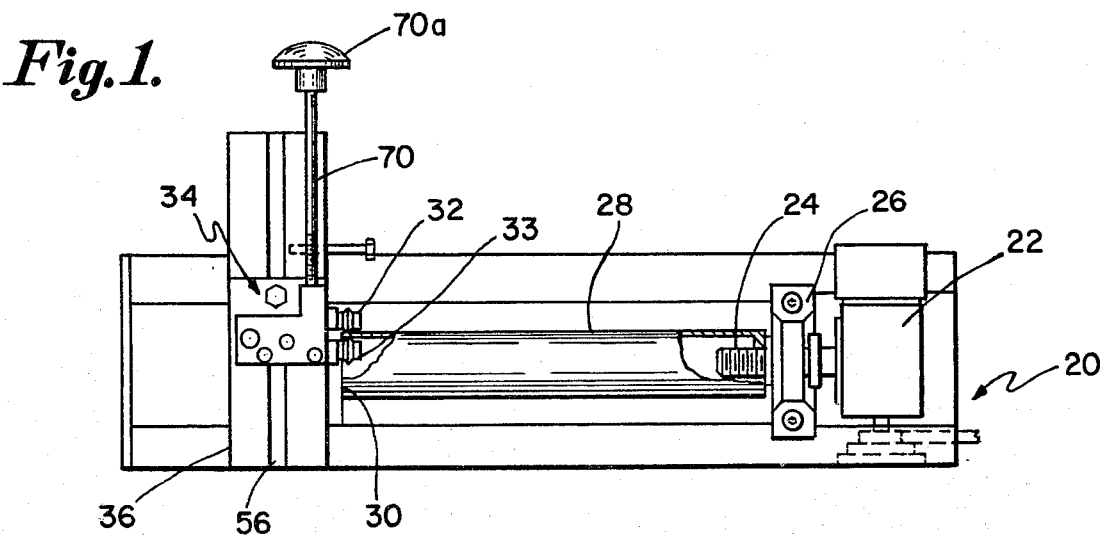
FIG. 1 is a plan view of a machine embodying the invention.

Referring now particularly to FIG. 1 on a base 20 is mounted a bearing 22 for a chuck 24. A chuck drive 26 provides a means for rotatably driving the chuck 24. A drill tube 28 is mounted on the chuck 24 so that the end rim 30 to be cut off lies between a pair of cutter wheels 32, and 33 of a cutter head 34 fixed to and mounted on a carriage 36. The outer cutter wheel 32 is on the outside of the outer convex surface or drill tube 28 and the inner wheel 33 is on the inner concave surface of the drill tube 28, so that as the wheels are brought to bear on the drill tube with opposed cutting edges the drill tube will be cut off in the 90° V shape imposed by the cutter wheels, as will be described more fully hereinafter. Parts such as the base 20, bearing 22, chuck 24, and drive 26 are known and require no further description.

Figure 2:
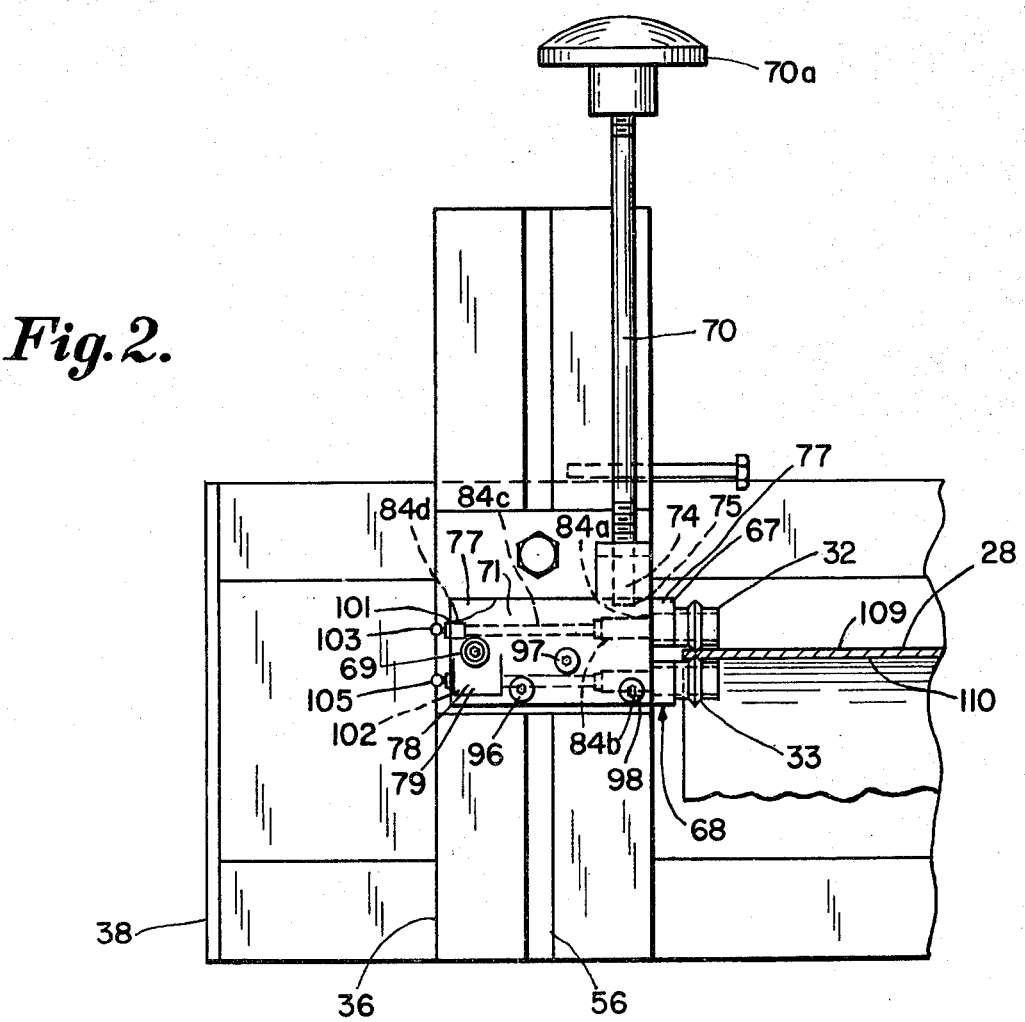
FIG. 2 is a plan view on an enlarged scale of a portion of the machine of FIG. 1 showing in greater detail the cutting portion of the machine of FIG. 1.

Referring now more particularly to FIGS. 2, 3 and 4, the base 20 comprises a rectangular frame 38, the two outer longitudinal members of which are parallel to the chuck axis and are formed of angle irons 40.

The carriage 36 comprises a lower table 42 at the bottom of which is a lower bar 44 and over which is an upper cross bar or table top 45. A bolt 46 is inserted from above through a plate 48 under the lower bar 44 and threaded into a cross-bar 49 which extends under the angles of the angle irons 40. The plate 48 is carried against the lower side of lower bar 44 with the edges 48a of the plate 48 parallel to the edges 40a of the angle irons by pins 50 so that the carriage does not cant when moved axially of the chuck and workpiece along the base. The pins 50 extend into, and are fixed in suitable apertures in cross bar 49 to assure that the lower bar 44 also retains the proper transverse orientation. By these means the carriage 36 may be adjusted to a desired position axially of the chuck 24, i.e., longitudinally, by releasing slightly the bolt 46. The carriage 36 is then moved or adjusted to the desired longitudinal position, and the bolt 46 tightened to draw the crossbar 49 against the under side of the angle irons 40. The longitudinal position of the lower table 42 and the carriage 36 is thus adjusted and fixed as desired.

A pair of spacer bars 52 are fixed respectively along the longitudinal edges of the table top 45. Riding on and fixed by any suitable means (not shown) to the spacer bars 52 is an upper table 53 comprising upstanding sides 54 and an upper table top 55. The upper table top 55 has a transverse slot 56.

A rectangular metal base 58 serves as a seat for carriage 36. A bolt 60 passes through the slot 56 in the carriage seat 58 and is threaded into a nut 62 under the slot 56 under the upper table top 55. This nut 62 is larger in horizontal dimensions than the width of the slot 56. A guide block 64 rides in the slot 56 and is fastened rigidly under and to the carriage seat 58 as by a screw 65 inset from beneath the block 64 into the carriage seat 58 and aided by the bolt 60 which passes through an aperture in the guide block 64. Thus, the bolt 60 may be slightly loosened, the carriage seat 58 translated along the slot 56 guided by the guide block 64. When a desired position is reached the bolt 60 may be tightened in the nut 62. The carriage seat 58 is thus adjusted to and fastened in a desired transverse position by these means.

The cutter head 34 comprises a housing 66, first and second cutter wheel arms 67 and 68, and the cutter wheels 32 and 33 respectively held by the arms 67 and 68, a pivot bolt (or axle) 69, and a set screw 70 with handle 70a. The housing 66 comprises a pair of L-shaped plates, an upper plate 71 and a lower plate 72 coextensive and parallel, and joined at one end of one arm of the L by a junction 73 being in the form of a further plate at right angle to the parallel plates. Through the junction 73 is threaded the set screw 70. One end 74 of the set screw advances into an indentation 75 in the first cutter wheel arm 67. The first cutter wheel arm 67 comprises a bar 77 in an L-shape, but with one short leg 78 which is bifurcated to form a pair of tabs 79. Apertures 80 coaxial and coextensive in the parallel plates 71 and 72 allow the shank 69a of bolt 69 to pass through the upper and lower plates 71 and 72 and serve as a pivot axis. The bolt 69 is threaded at its end 69c into the carriage seat 58, and has there a shoulder 69d to prevent over-penetration. Further, the first cutter wheel arm 67 has an aperture through the bar 77 (and partly through the tabs, or bifurcations 78) which also permits the first arm 67 to rotate about the axis of pivot bolt 69. Thus the enlarged head 69b of the bolt 69 prevents escape upward of the upper plate 71 of housing 66 and though snugly holding the housing plates to the upper surface of the carriage seat 58, still permits a free float or rotation of the housing, and the first cutter arm 67 thus captured between the head 69b and the end 69c is threaded into the carriage seat 58.

The first cutter wheel arm 67 includes in addition to the bar 77 a shaft 83 on which the first cutter wheel 32 is mounted for rotation. The shaft 83 has an enlarged anterior head 83a to retain the wheel 32 and a posterior portion which enters a suitable bore 84 in the bar 77 a little off-center toward the other cutter arm. The bore 84 has a shoulder at 84a to prevent the shaft 83 from entering so far as to bind rotation of the cutter wheel 32. The shaft 83 may be held in place by suitable threads at the reduced diameter part 84b of bore 84 deeper than the shoulder 84a into which the bar 77 may be threaded at its end or the shaft as shown may be extended into a still smaller diameter portion as at 84c and held by a screw 86 at the end 84d remote from the cutter wheel 32.

The second cutter wheel arm 68 is made somewhat similarly to the first arm 67 and includes a bar 87 (though not L-shaped) and a shaft 93 having an enlarged head 93a. The shaft 93 is set in a bore 94 having a shoulder 94a, reduced diameter part 94b and a continued further reduced part 94c receiving at the end 94d a screw 95 to hold in place the shaft 93. Further different from the first holder at its posterior end remote from the cutter wheel 33, the bar 87 is flattened on upper and lower faces to provide flat planar surfaces 87a and 87b respectively which slip between the bifurcated tabs 79 of the bar 77. The center of the bore 94 in bar 87 is also offset towards the adjacent arm 67. Three holding screws 96, 97, and 98 pass through the upper plate 71 to engage and hold in place the second arm 68 relative to the housing 66. Two of these screws 96 and 98 engage the outer side of the bar 87 at longitudinal distance from each other on one transverse side of the bar 87 opposite the first holder, and the other screw 97 engages the inner side of the bar adjacent the first arm. Thus the bar 87 of the second arm is rigidly attached to and constrained to move with the housing 66.

The off-centered arrangement of the arm bores 84, 94 and the inclusion of the flat ends 87a and 87b between the bifurcations 77 admits of positioning the cutter wheels 32 and 33 so close together that their cutting edges substantially contact as the shafts come into parallelism, even though the cutter wheels 32, and 33 are formed of drill rod stock, and the depth of cut for one wheel from cutting edge to center, (the distances in FIG. 5, from cutting edge 32a to axis of the wheel) is only 0.5 inch, and from cutting edge 32a to the end of the cutting slope as measured normal to the cutting wheel axis is only 0.125 inch. Thus, the maximum thickness of cut is only about 0.25 inch in this embodiment. Yet the wheels may be brought together into virtual contact.

In operation the carriage 36 is removed axially from the chuck 24 sufficiently for insertion of a drill tube workpiece 28 into the chuck. The set screw is retracted a bit and the cutter heads separated a little to leave a space between the cutter wheels 32 and 33. The carriage 36 is then adjusted longitudinally and transversely to bring the rim end 30 of the drill tube 28 to be cut off between the cutter wheels. The set screw may be advanced until the V shaped cutting edges of cutter wheels 32 and 33 just touch the workpiece with the axis of the shafts 83 and 93 as nearly parallel to each other and to the chuck axis as possible. The bolts 46 and 60 are tightened with the cutter head 34 in the desired position. The chuck drive 26 is now started to drive the workpiece 28. The set screw 70 is slowly advanced a little at a time. As the set screw 70 is advanced counteracting torques are developed, one clockwise (as viewed in FIG. 2) from the force of the end 74 of the screw 70 against the first cutter wheel arm 67 to turn the latter about the pivot axis of bolt 69 and the other equal and opposite caused by the reaction against the set screw in the threaded junction 73 turning the housing 66 and the second cutter wheel arm 68 fixed to it in a counter-clockwise direction about the pivot bolt 69. Thus, one cutter wheel 32 is forced clockwise and the other cutter 33 counter-clockwise about the pivot bolt 69, and so forced towards each other. At the same time minor variations in the diameter of the drill tube workpiece 28 near the rim end 30 are compensated for because both wheels 32 and 33, rotate clockwise or counter-clockwise as required by such a variation about the axis 69 by the same amount, thus always bringing to bear upon both the outer convex surface 109 and the inner concave surface 110 of the drill tube workpiece 28 equal cutting forces. This floating action about the axis 69 of both wheels 32 and 33 insures that the cut, when completed, is an equal cut on both inside and outside, and of equal angles B from a plane at right angles to the axis of the chuck 24 (and also the workpiece 28) entirely around the cut edge of the workpiece. Notwithstanding the minor diameter variations of the workpiece (See FIGS. 5 and 6). Moreover, further contributing to the regularity of the cut are the housing 66 and the manner in which the cutter arms 67 and 68 fit within the housing between and against the parallel mounting plates 71 and 72. By this arrangement any tilt or skew of the cutter wheels is effectively prevented. As the workpiece edge rim 30 between the cutter wheels 32 and 33 advances downward, any downward motion of the wheels 32 and 33 is prevented by the lower plate 72 bearing against the upper surface of the carriage seat 58 and yet the housing 66 is captured and held by the head 69b of the bolt 69. Thus, the cutter wheels 32 and 33, remain oriented normal to the work surface without tilt or skew so that the resultant cut edge of the shank for the tool has substantially an internal angle C of a true 90° and an angle B of 45° from a plane 99 normal to the axis on each side.

A substantially true salient angle of 270° between the cut surfaces is achieved, forming a true equilateral 90° triangle (as viewed in cross-section in a plane containing the axis, FIG. 6) between the cutting surfaces and a line such as line 100 between the edges of the cutting surfaces with the workpiece surfaces and the tip 32a or cutting edge of the cutting surfaces. Such an internal 90° angle of the crown edge of the shank is highly desirable in forming the attachment to the tool.

The inner faces 89 and 90 of the plates 71 and 72 of housing 66 are flat, planar and parallel and are in intimate, sliding contact each with one of the pair of outer flat, planar parallel faces 91 and 92 of the first cutter wheel arm 67, from proximate the pivot axis 69 to proximate the cutter wheels 32 and 33 to guide the arm and housing during pivoting and prevent cutter fluctuation, loose pivoting or off center V shaping of the annular crown.

Each cutter arm 67 or 68 includes an axial bore 101 or 102, terminating in a lubrication fitting 103 or 105, so that the cutter wheel shafts may be conveniently lubricated without disassembly and down time.

Accordingly the invention provides a superior machine and method for cutting a crown edge on a cylindrical workpiece for forming a shank for a core cutter of the like.

I claim:

1. Apparatus for forming, and exactly centering, an integral, annular crown of V cross section on the edge of the hollow cylindrical drill tube of a diamond core drill bit, said apparatus being of the type having means for power rotating said drill tube around a horizontal axis by support at one end having a cutter head mounted for selective positioning proximate the free, rotating, other end of said tube for cutting the end edge thereof, said apparatus characterized by:
   said cutter head having a pair of cutter arms, each pivoted to the other, at one end, and each having a roller cutter of V section, at the other end thereof, one said arm having a pair of equally spaced apart, opposite, flat, planar, parallel outer faces extending from said one end to proximate said other end;
   and said cutter head having a cutter arm housing formed by a pair of spaced apart plates, having flat, planar, parallel, inner faces extending from proximate said one end to proximate the other end of said arms and in intimate sliding contact with the outer faces of said one arm to guide said arm, within said housing in its path of pivoting, the other said arm being affixed between said plates to pivot therewith;
   and thrust screw mechanism, operable in said housing, proximate said other ends of said arms thereof, for pivoting said one arm and said housing, with its affixed other arm, toward each other to cut said V shape crown.

2. Apparatus as specified in claim 1 wherein:
   each said cutter arm is of solid cross section with an axial bore extending therethrough from one said end to the other said end for forming a lubrication conduit leading to the roller cutters at said other end thereof.

3. Apparatus for accurately forming a V crown on the rim of a cylindrical core bit tube comprising:
   a chuck for holding the uncut cylindrical core bit tube;
   means for rotating the chuck and the core bit tube held therein;
   a carriage;
   means permitting adjustment of the axial position of said carriage in relation to the chuck;
   a cutter head carried by said carriage and comprising;
   a housing having a pair of parallel plates joined at a junction which has a threaded opening;
   a thrust screw threaded into said opening and extending between the plates;
   a first cutter arm within the plates of said housing and receiving the end of said thrust screw, said housing and first cutter arm having aligned openings;
   a pivot bolt passing through said aligned openings and into said carriage, said bolt forming an axis about which said housing and said first cutter arm may rotate;
   a second cutter arm, fixed to said housing within said plates side by side with said first cutter arm on the side of said first arm remote from said thrust screw;
   a pair of roller cutters respectively held in said cutters arms and having V shaped cutting edges positioned in opposition, to receive between the cutting edges, the rim of the core bit tube to be cut off;
   whereby the cutter head may be positioned with the roller cutters respectively on the convex outside and the concave inside of the cylindrical rim of the core bit tube and the thrust screw may be advanced against said first cutter arm through said threaded opening to exert simultaneously a couple about said axis forcing the roller cutter of the first cutter arm toward the other roller cutter, and a couple drawing the housing and the other roller cutter towards the first roller cutter to cut the rotating core bit tube between the cutting V shaped edges.

4. Apparatus as claimed in claim 3 wherein:
   said roller cutters have substantially parallel axis when said edges contact, and said edges each have in axial cross-section a 45° internal angle cutting edge whereby the apparatus cuts a crown with substantially true 90° internal angle.

5. A method of cutting a V shaped crown on the rim of the tube of a diamond core drill bit comprising the steps of:
   rotating the tube centered in a chuck;
   inserting the edge of the tube between two cutting wheels held respectively on two arms, with the cutting wheel edges opposed on opposition inside and outside of the tube;
   mounting one of said arms between the parallel plates of a housing, said housing and said one arm each being separately rotatable about a common axis;
   mounting the other of said arms between said plates and fixed to said plates of said housing;
   adjusting a set screw carried by said housing to exert a force on the one arm toward the other arm and drawing the other arm toward the one arm, thus to force the cutting edges together as the tube is rotated;

thereby to cut the tube leaving a crown edge on the rim.

6. A method as claimed in claim 5:

said cutter wheels having respectively edges of axial cross-section displaying a 90° internal cutting edge, thus to leave a 90° crown cut on the cut drill tube.

* * * * *